US008483706B2

(12) United States Patent  
Edge et al.

(10) Patent No.: US 8,483,706 B2
(45) Date of Patent: Jul. 9, 2013

(54) LOCATION SERVICES BASED ON POSITIONED WIRELESS MEASUREMENT REPORTS

(75) Inventors: Stephen W. Edge, Escondido, CA (US); Christopher Brunner, San Diego, CA (US); Oronzo Flore, Ostuni (IT); Sven Fischer, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 536 days.

(21) Appl. No.: 12/395,384

(22) Filed: Feb. 27, 2009

(65) Prior Publication Data

US 2009/0258658 A1    Oct. 15, 2009

Related U.S. Application Data

(60) Provisional application No. 61/045,218, filed on Apr. 15, 2008.

(51) Int. Cl.
*H04W 24/00* (2009.01)
(52) U.S. Cl.
USPC ..................................... 455/456.1; 455/456.5
(58) Field of Classification Search
USPC .............. 455/404.2, 414.1–414.4, 456.1–457
See application file for complete search history.

(56) References Cited

U.S. PATENT DOCUMENTS

| 5,386,456 | A | 1/1995 | Schatz et al. |
| 5,657,487 | A | 8/1997 | Doner |
| 5,838,674 | A | 11/1998 | Forssen et al. |
| 6,104,936 | A | 8/2000 | Kronestedt |
| 6,108,558 | A * | 8/2000 | Vanderspool, II ......... 455/456.2 |
| 6,140,963 | A | 10/2000 | Azzarelli et al. |
| 6,167,286 | A | 12/2000 | Ward et al. |
| 6,269,246 | B1 | 7/2001 | Rao |
| 6,393,294 | B1 | 5/2002 | Perez-Breva |
| 6,473,619 | B1 | 10/2002 | Kong et al. |
| 6,745,034 | B2 | 6/2004 | Wang et al. |
| 6,782,265 | B2 | 8/2004 | Perez-Breva |
| 7,248,897 | B2 | 7/2007 | Hsu |
| 7,289,834 | B2 | 10/2007 | Sun et al. |
| 7,797,000 | B2 | 9/2010 | Anderson |

(Continued)

FOREIGN PATENT DOCUMENTS

| CN | 1491064 A | 4/2004 |
| DE | 19836778 | 2/2000 |

(Continued)

OTHER PUBLICATIONS

International Search Report—PCT/US09/040720, International Search Authority—European Patent Office —Jul. 7, 2009.

(Continued)

*Primary Examiner* — George Eng
*Assistant Examiner* — Marcus Hammonds
(74) *Attorney, Agent, or Firm* — Arnold J. Gum

(57) ABSTRACT

Methods and apparatuses are provided that may be implemented in a wireless signaling environment to provide certain location services. The location services may, for example, be based at least in part on positioning information associated with positioned wireless signaling measurements associated with wireless terminals. The location services may comprise location using signal pattern matching, location using observed timing differences, location using fine time assistance, location of significant network events and location distribution of terminals over a certain coverage area.

83 Claims, 2 Drawing Sheets

U.S. PATENT DOCUMENTS

| | | | |
|---|---|---|---|
| 2002/0175860 A1 | 11/2002 | Ruutu et al. | |
| 2003/0148774 A1 | 8/2003 | Naghian et al. | |
| 2004/0082344 A1 | 4/2004 | Moilanen et al. | |
| 2006/0068849 A1 | 3/2006 | Bernhard et al. | |
| 2006/0240841 A1* | 10/2006 | Bhattacharya | 455/456.1 |
| 2006/0270841 A1 | 11/2006 | Espeseth et al. | |
| 2007/0021085 A1 | 1/2007 | Kroeger | |
| 2008/0096566 A1 | 4/2008 | Brunner | |
| 2008/0240070 A1 | 10/2008 | Feher | |
| 2008/0316091 A1* | 12/2008 | Wigren et al. | 342/357.02 |
| 2009/0011775 A1* | 1/2009 | Niemenmaa et al. | 455/456.1 |
| 2011/0098057 A1* | 4/2011 | Edge et al. | 455/456.1 |

FOREIGN PATENT DOCUMENTS

| | | |
|---|---|---|
| DE | 10031178 | 1/2002 |
| EP | 1315393 A1 | 5/2003 |
| EP | 1317161 A1 | 6/2003 |
| JP | 2004530322 A | 9/2004 |
| JP | 2009528546 A | 8/2009 |
| WO | 9955018 | 10/1999 |
| WO | 03041436 | 5/2003 |
| WO | WO03086005 A1 | 10/2003 |
| WO | WO03098953 A1 | 11/2003 |
| WO | WO2004095868 A2 | 11/2004 |
| WO | 2007096713 A1 | 8/2007 |
| WO | 2007103821 A2 | 9/2007 |

OTHER PUBLICATIONS

Written Opinion—PCT/US09/040720, International Search Authority—European Patent Office—Jul. 7, 2009.

Kaemarungsi, Kamol,(B.Eng., King Mongkut's Institute of Technology at Ladkrabang, Tahiland, 1994, M.S. in Telecommunications, Univ. Colo. at Boulder, 1999), "Design of Indoor Positioning Systems Based on Location Fingerprinting Technique," Graduate Faculty of School of Information Science, Univ. of Pittsburgh, pp. 1-193, (2005).

Laitinen, Heikki; Ahonen, Suvi; et al., "Cellular Network Optimisation Based on Mobile Location," Cellular Location Technology, Cello-WP2-VTT-D03-007-Int., (Project Number: IST-2000-25383-CELLO), pp. 1-44, (Oct. 25, 2001).

Li, Binghao et al., "A New Method for Yielding a Database of Location Fingerprints in WLAN," Communications, IEE Proceedings, vol. 152, Issue 5, pp. 580-586, Oct. 7, 2005.

Taiwan Search Report—TW098112563—TIPO—Jul. 30, 2012.

Universal Mobile Telecommunications System (UMTS); User Equipment (UE) Positioning in Universal TerrestrialRadio Access Network (UTRAN); Stage 2 (3GPP TS 25.305 version 7.3.0 Release 7), pp. 1-81, ETSI TS 125 305v7.3.0 (Jun. 2006).

* cited by examiner

LOCATION SERVICES BASED ON POSITIONED WIRELESS MEASUREMENT REPORTS

RELATED APPLICATIONS

This patent application claims benefit and priority to U.S. Provisional Patent Application 61/045,218, filed Apr. 15, 2008, and which is incorporated in its entirely by reference herein.

BACKGROUND

1. Field

The subject matter disclosed herein relates to electronic devices and more particularly to methods and apparatuses for use in electronic devices for use in wireless communication systems.

2. Information

Wireless communication systems and devices are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to communicate with more than one wireless communication system and this trend appears to be growing.

Another popular and increasingly important wireless technology includes navigation systems and devices and in particular satellite positioning systems (SPS) such as, for example, the Global Positioning System (GPS) and other like Global Navigation Satellite Systems (GNSS). An SPS receiver, for example, may receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path, such as, for example a cellular telephone.

Other positioning techniques are also known and available for use in locating a mobile device such as a cellular telephone within the coverage area of a wireless network. For example, various signaling/timing techniques may be employed to determine or otherwise estimate the location of the cellular telephone based on trilateration and/or other like processes.

SUMMARY

Methods and apparatuses are provided that may be implemented in a wireless signaling environment to provide certain location services. The location services may, for example, be based at least in part on positioning information associated with positioned wireless signaling measurements.

By way of example, in accordance with one aspect an example method may include accessing positioning information associated with wireless signaling measurements for a plurality of mobile terminals and a plurality of base stations, and determining location information for a target mobile terminal based, at least in part, on the positioning information and signaling information associated with the target mobile terminal.

In certain example implementations location information may be determined by performing signal pattern matching based, at least in part, on the positioning information and the signaling information associated with the target mobile terminal.

In certain example implementations, the wireless signaling measurements may be based, at least in part, on a Measurement Report Messages (MRMs) associated with the mobile terminals, the wireless signaling measurements may be associated with Wideband Code Division Multiple Access (WCDMA) signaling, and/or the positioning information may include Real Time Difference (RTD) information.

In certain example implementations, a method may include, predicting one or more estimated Real Time Differences (RTDs) based at least in part on the positioning information, determining an estimated location of the target mobile terminal based at least in part on an Observed Time Difference of Arrival (OTDOA) and at least one of the estimated RTDs, establishing fine time assistance information for at least one base station based at least in part on at least one of the estimated RTDs, and/or providing the fine time assistance information to a base station and/or at least one mobile terminal.

In certain example implementations, a method may include determining event location information associated with at least one network event based, at least in part, on the location information.

In certain example implementations, a method may include establishing the positioning information by receiving wireless signal measurements and observed timing differences (OTDS) associated with the plurality of mobile terminals and the plurality of base stations, and determining location estimates for the plurality of mobile stations and RTDs for the plurality of base stations. Certain methods may also include establishing signal measurements for different locations based at least in part on the positioning information.

By way of example, in accordance with one aspect an example apparatus may be operatively enabled to access positioning information associated with wireless signaling measurements for a plurality of mobile terminals and a plurality of base stations, and determine location information for a target mobile terminal based at least in part on the positioning information and signaling information associated with the target mobile terminal.

In accordance with another aspect, an example apparatus may be operatively enabled to access positioning information associated with wireless signaling measurements for a plurality of mobile terminals and a plurality of base stations, and determine location information for a target mobile terminal based at least in part on the positioning information and signaling information associated with the target mobile terminal.

In certain other example implementations, an apparatus may include a special purpose computing device with memory having stored therein positioning information associated with wireless signaling measurements for a plurality of mobile terminals and a plurality of base stations, and a processing unit operatively coupled to the memory and operatively enabled to determine location information for a target mobile terminal based, at least in part, on the positioning information and signaling information associated with the target mobile terminal.

In accordance with yet another aspect, an article of manufacture may be provided that includes a computer readable medium having computer implementable instructions stored thereon which if implemented by one or more processing units in a special purpose computing device operatively enables the one or more processing units to access positioning information associated with wireless signaling measurements for a plurality of mobile terminals and a plurality of base stations, and determine location information for a target mobile terminal based, at least in part, on the positioning information and signaling information associated with the target mobile terminal.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
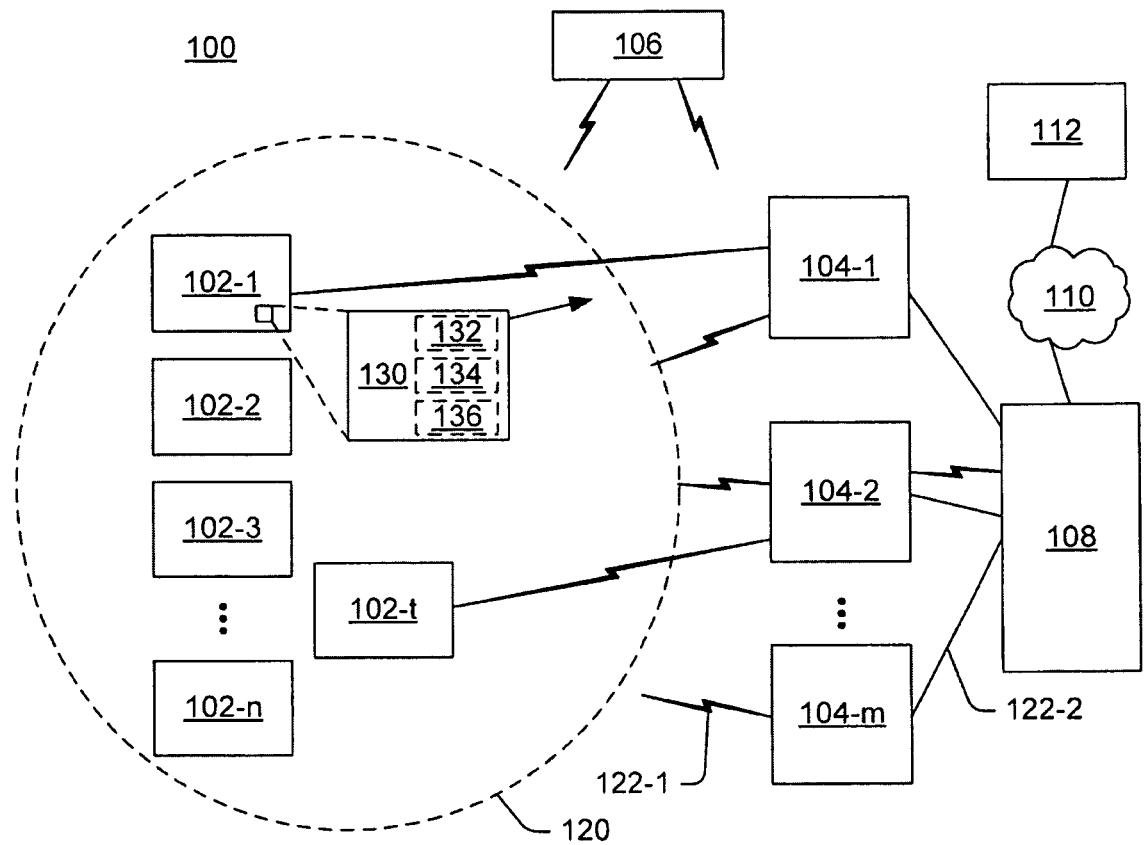
FIG. 1 is a schematic block diagram illustrating a wireless signaling environment that includes a computing platform operatively enabled to provide certain location services that may be based, at least in part, on positioning information associated with positioned wireless signaling measurements in accordance with an example implementation.

Some example methods and apparatuses are described that may be employed in a wireless signaling environment to provide certain location services. The location services may, for example, be based at least in part on positioning information associated with positioned wireless signaling measurements.

As described in greater detail below, in accordance with certain example implementations, a method may be implemented using one or more computing platforms coupled to other wireless network resources to provide location services. Such a method may, for example, include accessing positioning information associated with wireless signaling measurements collected over a period of time from a plurality of mobile terminals with regard to signaling that occurs between the mobile terminals and the various base stations, and determining location information for a target mobile terminal based, at least in part, on at least one of the accessed positioning information, the wireless signaling measurements, the location information, the additional signaling information associated with the target mobile terminal, and/or the like.

The method may, for example, include performing signal pattern matching based, at least in part, on the accessed positioning information and the additional signaling information associated with the target mobile terminal. The additional signaling information associated with the target mobile terminal may be received directly from the target mobile terminal and/or indirectly from other network resources, for example. The resulting location information may be provided to one or more other network resources, and/or a network location service, for example. In certain implementations, for example, the location information may be based, at least in part, on Observed Time Difference of Arrival (OTDOA) information associated with the target mobile terminal.

In certain example implementations, at least one of the wireless signaling measurements may include corresponding time-stamp information and/or mobile terminal location information. In certain example implementations, mobile terminal location information may be based, at least in part, on SPS information. By way of example but not limitation, such SPS information may include or otherwise be associated with GPS data, Assisted-GPS (A-GPS) data, GNSS data, Assisted-GNSS (A-GNSS) data, and/or other like data.

As described in greater detail below, in certain example implementations, at least one of the wireless signaling measurements is based, at least in part, on a Measurement Report Message (MRM) and/or the like which may be provided by the various mobile terminals. For example, mobile terminals may transmit MRMs associated with Wideband Code Division Multiple Access (WCDMA) signaling.

The positioning information may, for example, include Real Time Difference (RTD) information. An RTD concerns the difference in transmission timing between any pair of base stations. For example, this may be the difference between the absolute (e.g. Coordinated Universal Time) time at which a certain timing signal is transmitted at one base station and the absolute time at which the same or a corresponding signal is transmitted at another base station. A method may, for example, include predicting one or more estimated RTDs based, at least in part, on the positioning information. A method may, for example, include determining an estimated location of the target mobile terminal based, at least in part, on an OTDOA and at least one of the estimated RTDs. A method may, for example, include establishing fine time assistance information for at least one base station based, at least in part, on at least one of the estimated RTDs. The fine time assistance information may be provided to the base station and/or other network resources, for example, and may be associated with a SPS time.

As will also be described in greater detail below, in certain example implementations, the method may include determining event location information associated with at least one "network event" based, at least in part, on the location information. In certain example implementations, at least one of the wireless signaling measurements may include a combined wireless signaling measurement. A method may, for example, include determining a distribution of mobile terminals within a coverage area based, at least in part, on the combined signal measurement.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Reference is now made to FIG. 1, which is a block diagram illustrating a wireless signaling environment 100 that includes a computing platform 108 operatively enabled to provide certain location services that may be based, at least in part, on positioning information 230 associated with positioned wireless signaling measurements 130 in accordance with an example implementation.

Wireless signaling environment 100 may, for example, include a plurality of mobile terminals 102, which are illustrated in FIG. 1 as 102-1, 102-2, 102-3, . . . 102-t, . . . , 102-n. In later examples, mobile terminal 102-t may be referred to as a target mobile terminal. The mobile terminals, as shown in FIG. 1, are intended to represent any type(s) of device(s), machine(s), etc., that may be operatively enabled to wirelessly communicate while within at least a portion of a coverage area within wireless signaling environment 100. Thus, by way of example but not limitation, mobile terminal 102-n may include a cellular/mobile telephone, a portable computer, a personal digital assistant, a tracking device, a navigation device, and/or the like. As illustrated in FIG. 1, mobile terminals 102 may be operatively enabled to communicate through wireless communication links to one or more base stations 104-1, 104-2, . . . , 104-m. In certain example implementations, one or more of mobile terminals 102 may be operatively enabled to receive and/or process SPS data that may be transmitted through signals from one or more SPS 106.

Base stations 104-1, 104-2, . . . , 104-m, as shown in FIG. 1, are intended to represent any type(s) of device(s), machine(s), etc., that may be operatively enabled to wirelessly communicate with one or more mobile terminals 102 while present within at least a portion of a coverage area within wireless signaling environment 100. Each base station may be assigned and/or otherwise arranged to provide such wireless communication services within at least a cell (not shown) via wireless communication links (e.g., represented by link 122-1). A mobile terminal may be serviced by one or more base stations depending upon location and/or system design. Base stations 104-1, 104-2, . . . , 104-m may be operatively coupled together and/or to other network resources, etc. With regard to this example implementation, as illustrated, base stations 104-1, 104-2, . . . , 104-m may be operatively coupled to a location service resource 108, for example, via wired, fiber, and/or wireless communication links (e.g., represented by link 122-2).

Location service resource 108 is intended to represent any type(s) of device(s), machines, etc., that may be operatively enabled to perform at least a portion of the location service(s) described in the example implementations herein and/or claimed subject matter. In certain implementations, for example, such location services may be based at least in part on positioning information associated with positioned wireless signaling measurements and location service resource 108 may include one or more computing platforms. In certain example implementations, location service resource 108 may be implemented in one or more computing platforms that are also enabled to provide other services. For example, location service resource 108 may be implemented in one or more computing platforms that are also enabled to provide Radio Network Controller (RNC) services. In other example implementations location service resource 108 may be implemented in one or more dedicated computing platforms.

As described in greater detail below, location service resource 108 may, for example, be operatively enabled to access positioning information associated with wireless signaling measurements collected over a period of time from a plurality of mobile terminals 102 with regard to signaling that occurs between the mobile terminals and the various base stations 104. Location service resource 108 may also, for example, be operatively enabled to determine certain location information for target mobile terminal 102-t based, at least in part, on the positioning information and additional signaling information associated with the target mobile terminal 102-t.

Location service resource 108 may, for example, be operatively coupled to other resources through one or more networks 110. For example, in certain implementations another resource 112 may request and/or receive location information for target mobile terminal 102-t from location service resource 108 via one more networks 110. By way of example but not limitation, resource 112 may include an emergency location service and/or the like.

There may also be multiple instances of Location service resource 108 that perform the same or different location services and that may be enabled to transfer information between themselves. For example, one instance of location service resource 108 may be dedicated to receiving signaling measurements from mobile terminals 102 and base stations 104 and combining these to obtain position information for mobile terminals 102 and timing information for base stations 104. Such obtained information may be transferred to or accessed by another instance of Location service resource 108 which may use this information to perform location services for mobile terminal 102-t such as deriving the location of mobile terminal 102-t.

Figure 2:
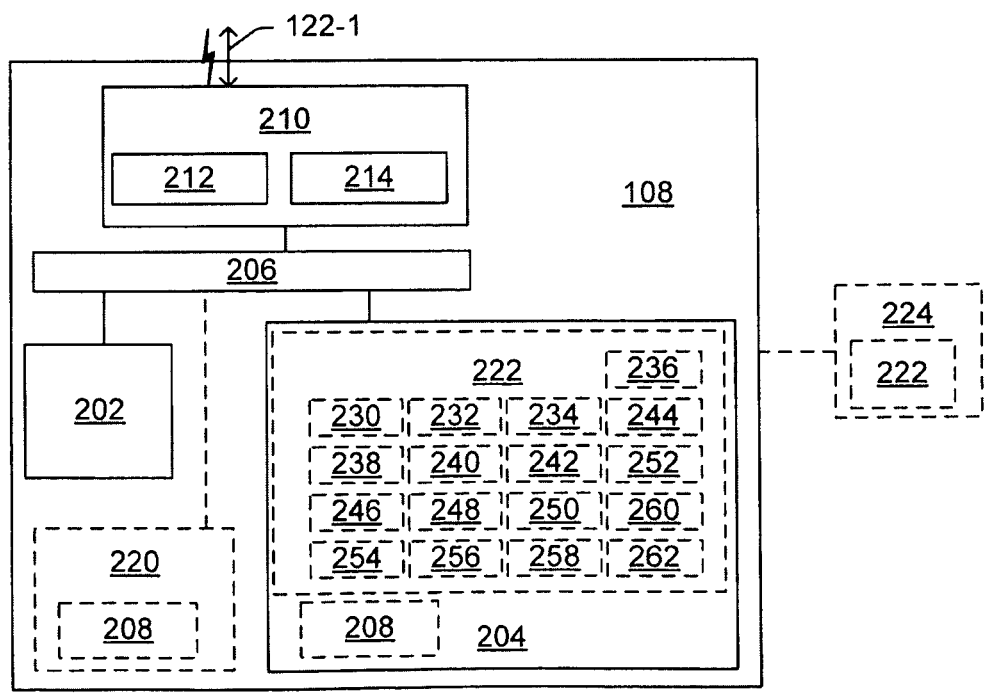
FIG. 2 is a schematic block diagram illustrating selected features of a computing platform operatively enabled to provide certain location services that may, for example, be implemented in the environment of FIG. 1.

Reference is now made to FIG. 2, which is a block diagram illustrating selected features of a computing platform operatively enabled to provide certain location services that may, for example, be implemented as location service resource 108 in FIG. 1.

As illustrated in the example in FIG. 2, location service resource 108 may include one or more processing units 202, memory 204, and communication interface 210, which may be operatively coupled with one or more connections 206 (e.g., buses, lines, fibers, links, etc.).

Processing unit 202 may be implemented in hardware, software, or a combination of hardware and software. Thus, for example, processing unit 202 may represent one or more circuits configurable to perform at least a portion of a data computing procedure or process. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 may represent any data storage mechanism. Memory 220 may include, for example, a primary memory and/or a secondary memory. Primary memory may include, for example, a random access memory, read only memory, etc. While illustrated in this example as being separate from processing unit 202, it should be understood that all or part of a primary memory may be provided within or otherwise co-located/coupled with processing unit 202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, computer readable medium 220. As such, in certain example implementations, the methods and/or apparatuses presented herein may take the form in whole or part of a computer readable medium 220 that may include computer implementable instructions 208 stored thereon, which if executed by at least one processing unit 202 may be operatively enabled to perform all or portions of the example location service(s) described herein. Such computer implementable instructions 208 may also be provided by memory 204, as also illustrated in this example.

Memory 204 may also include data 222 that may be associated with one or more of the example location service(s) described herein. All or part of data 222 may also and/or alternatively be provided by other devices 224 (e.g., other computing platform(s), data storage devices, and/or the like) that may be operatively coupled to location service resource 108.

As illustrated in the example of FIG. 2 and described in greater detail below, data 222 may, by way of example but not limitation include one or more of the following: positioning information 230, location information 232, signal pattern matching information 234, SPS information 236, GPS data 238, A-GPS data 240, GNSS data 242, A-GNSS data 244, RTD information 246, estimated RTD information 248, estimated location 250, OTDOA information 252, fine time assistance information 254, SPS time information 256, event location information 258, combined wireless signaling measurement information 260, and/or distribution of terminals information 262.

Communication interface 210 may, for example, include a receiver 212 and a transmitter 214, and/or combination thereof. As shown, communication interface 210 may be operatively enabled to communicate over wireless and/or wired/fiber links. Communication interface 210 may, for example, operatively couple location service resource 108 with one or more base stations 104, networks 110, other device 224, and/or the like.

Figure 3:
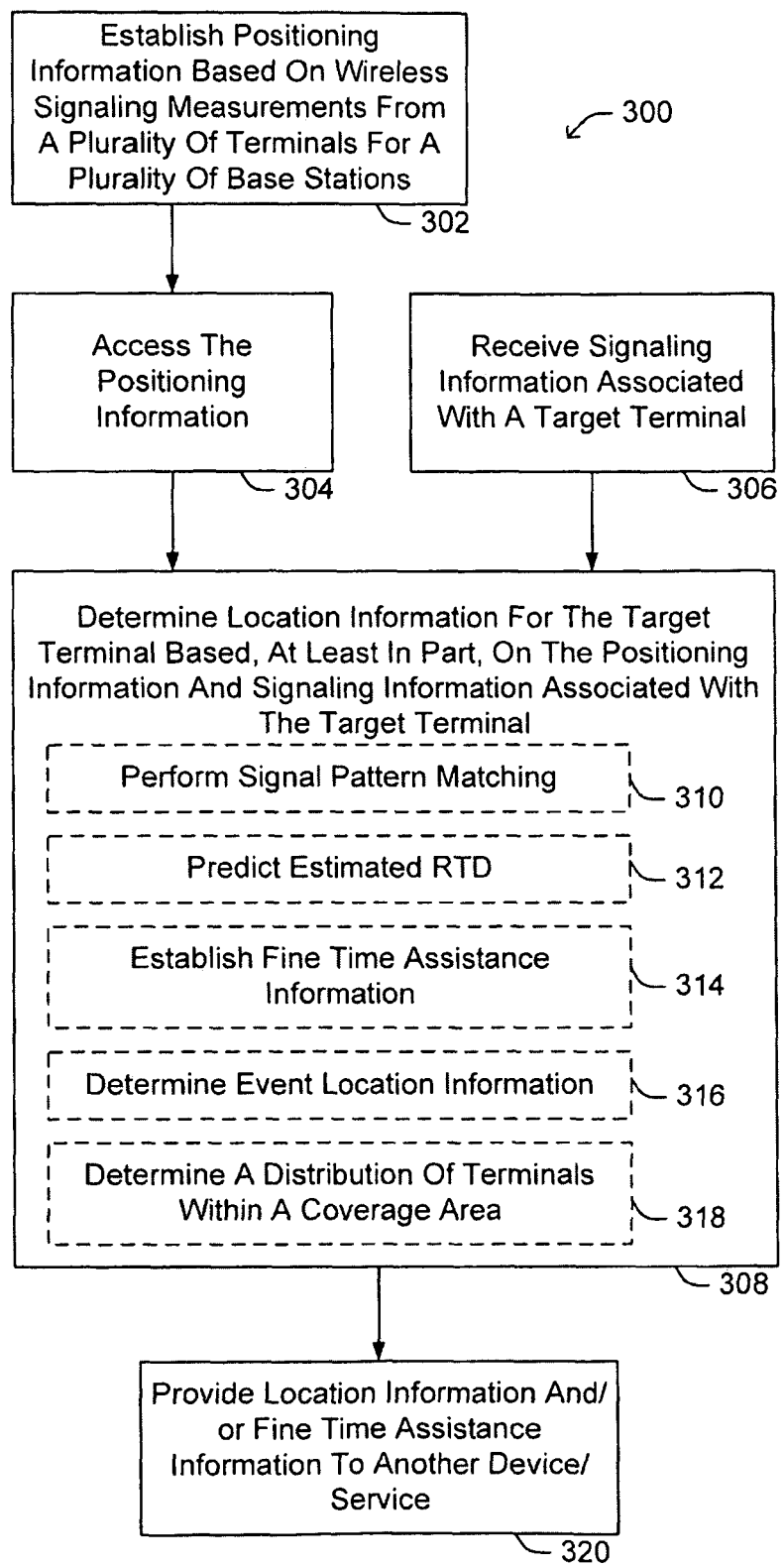
FIG. 3 is a flow diagram illustrating an exemplary method for providing certain location services that may, for example, be implemented in the environment of FIG. 1 and/or the computing platform of FIG. 2.

Attention is now drawn to FIG. 3, which is a flow diagram illustrating an exemplary method 300 that may be implemented to provide certain location services.

At block 302, wireless signaling measurements may be collected from a plurality of mobile terminals for a plurality of base stations and based, at least in part thereon, positioning information 230 may be established and stored in memory. At block 304, such positioning information 230 may be subsequently accessed.

At block 306, signaling information associated with target terminal 102-t may be received. At block 308, location information 232 may be determined for or in association with target terminal 102-t based, at least in part, on positioning information 230 and the received signaling information associated with target terminal 102-t.

As described in greater detail below, block 308 may, in certain example implementations, include one or more of blocks 310, 312, 314, 316, and/or 318. At block 310, pattern signal matching may be performed, for example, based on signal pattern matching information 234 and the received signaling information associated with target terminal 102-t. At block 312, for example, estimated RTD information 248 may be predicted. At block 314, for example, fine time assistance information 254 may be established. At block 316, for example, event location information 258 may be determined. At block 318, for example, distribution of terminals information 262 may be determined.

At block 320, for example, location information 232, fine time assistance information 254, and/or other information/data within data 222 may be provided to another resource (e.g., device, service, etc.).

With the above exemplary environment, apparatuses, and methods in mind, additional example details associated with the methodologies will now be described. These are intended as examples and as such are not necessarily intended to limit claimed subject matter.

Block 302 may, for example, include automatically and/or otherwise populating and/or maintaining a database (e.g., that includes at least a portion of data 222). For example, such a database may include wireless signaling measurements 136 (see, FIG. 1) that may be included in positioning information 230, and/or with which positioning information 230 may be based, at least in part. By way of example but not limitation, such a database and/or the like may be populated and/or maintained based, at least in part, on the techniques presented in U.S. patent application Ser. No. 11/830,657, filed Jul. 30, 2007, titled "Determination Of Cell RF Parameters Based On Measurements By User Equipments", and which claims priority to U.S. Provisional Patent Application No. 60/955,309, filed Jul. 31, 2006. These applications describe how, for example, sets of signal measurements may be time-stamped and location-stamped, and certain techniques for optimizing or otherwise affecting network configuration and operation based on such data. Additional and/or alternative example techniques are described in greater detail below that may be implemented in block 302.

Regardless as to the techniques employed at block 302 to establish the positioning information and/or other applicable information/data within data 222, such information/data may be access at block 304, for example, such that at block 308 location information and/or other like information/data may be determined. By way of example, in the sections below, some example location services are described in which data 222 may opertively support locating mobile terminals by signal pattern matching (block 310), location of mobile terminals using OTDOA and/or predicting an estimated RTD (block 312), establishing fine time assistance information for an SPS (e.g., A-GPS, A-GNSS, or the like) (block 314), determining the location of and/or otherwise tagging of certain network related events (block 316), and/or determining a distribution of mobile terminals within a coverage area or portion thereof (block 318).

As described herein, having established such data/database that include positioning information such as time-stamped and location-stamped signal measurements from many or all terminals in a network, at block 310 signal pattern matching information 234 may be established or otherwise accessed and used to support locating target mobile terminal 102-t by signal pattern matching. At block 312, RTD information 246 may be established or otherwise accessed and used to predict one or more estimated RTDs 248 and/or otherwise support OTDOA 252 based location of target mobile terminal 102-t. RTD information 246 and/or one or more estimated RTDs 248 may be used to improve fine time assistance, for example, by enabling SPS (e.g., GPS or GNSS) timing association for one base station (e.g., 104-1) to be obtained from that for another base station (e.g., 104-2). At block 316, the location of target mobile terminal 102-t and/or other mobile terminals which may be determined at block 308 based, at least in part, on data 222 (e.g., using pattern matching, OTDOA) may be also be used to determine the location of certain (e.g., significant) network related events.

Mobile terminals 102 and/or base stations 104 may be operatively enabled to receive SPS signals, for example, associated with a GNSS such as GPS, Galileo, GLONASS, NAVSTAR, and/or the like, and/or applicable/alternative pseudolite based systems.

Example of Block 302

The following provides a description of a particular system/technique that may be used with the above in block 302.

In the following, designation that something is "optimized" "required" or other designation does not indicated that the current disclosure applies only to systems that are optimized, or systems in which the "required" elements are not present (or other limitation due to other designations). These designations refer only to the particular described implementation. Of course, many implementations are possible. The techniques may be used with protocols other than those discussed herein, including protocols that are in development or to be developed.

For certain wireless technologies, like 3rd Generation Partnership Project (3GPP) WCDMA, wireless terminals 102 may be enabled to periodically measure signal strength and other signal attributes (e.g. signal to noise ratio) for serving base station and/or neighboring base stations and to send these to a network resource (e.g., a 3GPP RNC) in a Measurement Report Message (MRM) or the like (e.g., positioned wireless signaling measurements 130). By way of example, in the case of Frequency Division Duplex (FDD) mode, an MRM may include the measured signal to noise ratio for the common pilot channel (CPICH) for a WCDMA base station (e.g., 3GPP node B), the received signal code power (RSCP) for the CPICH and the pathloss. Similar information may be provided for a Time Division Duplex (TDD) mode. The MRM contents for WCDMA, for example, are currently defined in 3GPP TS 25.331.

One purpose of these wireless signaling measurements is to enable the network to decide when to transfer (handover) a mobile terminal from one base station to another base station (e.g., node B) when the mobile terminal starts to move out of the coverage area of a serving base station(s) and/or transmission to and reception from this base station(s) may be impeded by other factors (e.g. buildings, walls, vehicles etc.). For WCDMA, handover, if it occurs, may take the form of soft handover in which an additional base station or base stations may be added to the active set of base stations currently supporting transmission to and reception from the mobile terminal (and in which one or more existing base stations in the active set may be removed). Alternatively, a hard handover may be used in which the currently active set of serving base station(s) may be replaced by a new active set of base station(s). For the purposes of assisting handover, the mobile terminal may also report the observed timing differences (OTDs) as seen by the mobile terminal between the signals received by the mobile terminal from pairs of neighboring or otherwise arranged base stations. An OTD corresponds to an RTD as seen at a particular location—e.g., the transmission timing difference between a pair of base stations observed at that location—whereas an RTD concerns transmission timing at the base station locations. However, an OTD will generally equal the RTD at any location equidistant from two base stations. In WCDMA, the OTDs and signal measurements may be obtained by the mobile terminal at the same time and reported to the network together in the same MRM message. The network may then timestamp each MRM message and store all or portions of it for later evaluation as well make use of the measurements at the time they were received for determining handover.

For evaluating stored measurements at a later time, the network (e.g. RNC, or other resource(s)) may store and make available the measurements received from a large number of different mobile terminals (e.g., a plurality of mobile terminals served by a particular RNC) over a period of time. The measurements may include not just those from different mobile terminals but also those received from the same mobile terminal at different points in time.

The resulting collection of measurements may be used to determine the location that each terminal had when performing each particular set of measurements. This may be include evaluating the OTDs and making use of the following information and relationships:

1. The locations of the various base stations may be known, for example, as obtained using surveying and/or by SPS measurement.

2. If the RTDs between signal transmissions from pairs of base stations are also known, then the location of a mobile terminal that has provided OTDs between two or more pairs of base stations may be determined for the time at which the OTDs were measured. This is a well known property of positioning methods based on OTD measurements. RTDs may be known if the base stations are synchronized to a common timing (e.g. GPS time) or if the base station transmissions times have a known relation to some common time or if separate measurement units at known locations periodically measure the RTDs between pairs of base stations.

3. If the RTDs are not known, the location of a mobile terminal may not be determined from a set of OTD measurements provided by that mobile terminal. However, the locations of a plurality of mobile terminals may be determined from the set of OTD measurements that the plurality of mobile terminals provides due to redundancy in the provided OTD measurements. In essence, if the number of OTD measurements provided by the plurality of mobile terminals significantly exceeds the number of RTD values between the pairs of base stations for which OTDs are provided, combined with the number of terminal (e.g., x, y) coordinates for the locations at which terminals send measurements to the network, then it may be possible to solve for (e.g., x, y) coordinates and RTD values because there may be more relationships between these variables than there may be variables.

4. Different methods may be used to solve for the (x, y) coordinates and RTD values. For example, iterative methods may be implemented to do this using Positioning MRMs in which, for example, estimates or fixed initial values for the unknown coordinate and RTD values are first assumed and the equations relating these unknown values to the known measured OTD values are then used to obtain new and more accurate estimates for the coordinate and RTD values. The more accurate estimates may then be reintroduced into the equations to obtain yet more accurate estimates and the process may be repeated (iterated) until the values for the location coordinates and RTDs converge to fixed values.

The location of each mobile terminal from which each MRM message was sent may be added to the MRM measurement data—resulting in sets of signal measurements at known times and known locations. A network operator or service may then use this data to determine signal conditions over the all or part of a network coverage area for the period of time covered by the measurements, excluding those areas where coverage is not provided. Here, for example, the latter areas may be identified from the lack of measurement reports for locations within them. Furthermore, for areas where signal measurements are received, measurements from different terminals and from the same terminal at different times may be combined (e.g. averaged, etc.) for the same or nearly the same locations to provide a desired level of accuracy in the signal data.

Such measurements may, for example, be related to time of day (e.g. averaged over consecutive days for the same time of day). Such measurement data may also be combined with other data obtained from or observed for mobile terminals (e.g., dropped calls, failed call attempts, etc.) to better correlate signal conditions with the consequences that may be caused by the signal conditions to wireless service. The combined signal measurement, timestamp and location data may be used to determine the distribution of mobile terminals over all or portions of the coverage area (e.g., density of mobile terminals at each location as a function of time of day and day of week, or the like). Here, for example, such resulting distribution of terminals information 262 may be of assistance to operators or services in improving network coverage (e.g., may help indicate useful adjustments to base stations like increased or reduced power output, antenna tilt, antenna height etc., and/or the locations where additional base stations may prove beneficial).

Example of Block 310

At block 310, such positioning MRM information may be used to assist locating target mobile terminal 102-t, using signal pattern matching. Thus, in addition to assisting network operators or services to improve and/or otherwise optimize network coverage, positioning MRM data or the like may be used to help locate target mobile terminal 102-t, e.g., as part of network location service, friend finder, direction finding, location of an emergency call, and/or the like.

One known method that may be used to determine the location of a mobile terminal is to obtain signal information from the mobile terminal of the serving and neighboring base stations (e.g. signal strength measurements and signal to noise ratios such as those sent in WCDMA MRM messages). Such signal information may then be compared to previously obtained signal measurements for the network made at a large number of different known locations covering the network serving area. If a match is found to a particular set of previously obtained signal measurements, in terms of having the same or almost the same corresponding signal measurements, then the known location at which those measurements were made may provide a good location estimate for the mobile terminal.

The above method relies on the fact that the set of signal measurements at any location is normally distinct from that at other locations and generally stable with time. This stable set of signal measurements may be regarded as a pattern or profile. For example, in two widely separate locations, the set of observable base stations may be different causing an obvious difference in the pattern of observed signal measurements. At two locations that are close together where the same set of base stations may be observable, the signal strengths and signal qualities for all base stations may not be the same, e.g., due to differing distances to each base station, different line of sight conditions, different levels of attenuation, different multipath conditions for non-line of sight to any base station, and/or other like factors. Thus the two patterns of signal measurements may not be the same.

To obtain the signal conditions at every location initially, different methods are available. One simple but time consuming and expensive method is to measure the signals at all locations or at a large number of locations. Another method is to calculate the expected signal measurements based on knowledge of base station locations, transmission characteristics and local topography (e.g., ground elevations and building and flora coverage). A combination of both methods may be used, for example, by measuring signals for a sampling of locations covering the network serving area and calculating signals for the remaining locations based on the measured signals for nearby locations.

To make the method more accurate and systematic, it may be convenient to calculate or measure signals at a set of pre-defined closely spaced locations, e.g., by overlaying a network coverage area with a rectangular or other like grid defining a set of points at fixed distances (e.g., 100 meters) from one another.

Measuring signals and/or calculating them according to these example processes above may not occur very often. Hence, the resulting data/database of signal measurements may contain errors, such as, e.g., errors resulting from incorrect signal measurement or calculation, and/or errors resulting from changes to network operation and local topography that may have occurred subsequent to compiling the initial set of measurements. Examples of such changes may include building construction, extension and demolition, deforestation, highway construction, changes in traffic flow, addition of new base stations and changes to existing base stations, and/or the like.

In order to avoid having to periodically re-measure or recalculate signal conditions and enable detection and correction of any initial errors in these, it may be an advantage to obtain signal measurements using other methods that may be employed on a continuous basis. There may also be an advantage in using such methods to compile the initial database of signal measurements or to validate and/or improve such an initial data/database obtained by other methods.

Thus, for example, in accordance with certain aspects of the present description, positioning MRMs or like method of collecting terminal signal measurements and deriving the mobile terminal locations from them may be used to establish and/or help establish a signal measurement database for use with signal pattern matching. Such methodology may further be employed to maintain the data/database as base station transmission and local topography may change. To accomplish this, the network may timestamp and store sets of MRM messages as they are received from mobile terminals, for example, in the normal course of network operation. At periodic intervals, the signaling measurements in the stored MRM messages may be used to determine the locations from which each MRM message had been sent. The result may include, for example, sets of MRM measurements with each set of MRM measurements having a timestamp and location. For each pre-defined location for which signal measurement data was needed, MRM measurements may first be collected (e.g., from the sets of time-stamped and located MRM measurements) for locations the same as or close to this. These measurements may, for example, then be combined to yield a single set of measurements (e.g., comprising signal strength and signal quality measurements for nearby base stations). Such a method of combination may, for example, employ averaging of corresponding measurements or weighted averaging (e.g. with higher weights assigned to measurements at locations closer to the required pre-defined location) or may employ some amount of calculation (e.g., adjustment of measurements from locations different to the pre-defined location according to the differences in topography and distances to the measured base stations at these locations). The results of such method of combination may include a single set of combined signal measurements for each pre-defined location, which may be used to replace or adjust (e.g., using a weighted averaging method) any previous set of signal measurements for these pre-defined locations. For pre-defined locations for which no MRM measurements may be available at nearby locations, previous measurement data may continue to be used.

The resulting data/database of signal measurements, collected using positioning MRMs, to support location using pattern matching may be further improved by obtaining precise locations for some of the mobile terminals providing the MRM signal measurements. For example, a mobile terminal may provide a SPS (e.g., GPS, A-GPS, etc.) derived location estimate in association with the signal measurements. Alternatively, the network (e.g., a RNC or other like resource) may obtain a location estimate of a mobile terminal itself (e.g., by invoking a SPS location). The more accurate locations together with the associated OTD values may be used to obtain more accurate RTD values between pairs of base stations which in turn may improve the accuracy of other locations obtained from the OTD and RTD values. The resulting, possibly more accurate, locations may enable more precise signal measurements to be obtained for the pre-defined locations for signal pattern matching information 234, for example.

The signal measurements collected as described above may then be used to locate or help locate the target mobile terminal in block 310 by comparing signal measurements from the target mobile terminal to signal measurements in database 222 that was established in block 302 and finding the location stored in the database whose associated signal measurements most closely match the signal measurements from the target mobile terminal.

Example of Block 312

Thus, for example, in accordance with certain aspects of the present description, portions of data 222 and/or other like data/database may be used to assist locating target mobile terminal 102-t based, at least in part, on observed time differences according to Block 312.

Various positioning methods that make use of measurements of observed timing differences between pairs of base stations by a mobile terminal whose location is to be determined are well known and include, for example, using an OTDOA to locate a mobile terminal in a WCDMA network, or using an Enhanced Observed Time Difference (E-OTD) to locate a mobile terminal in a GSM network. However, for either of these known positioning methods, the locations of base stations and the RTDs between base stations needs to be known together with OTDs in order to calculate a location for the mobile terminal. Here, for example, such RTDs are typically measured by special Location Measurement Units (LMUs) at known locations but this may be time consuming and/or expensive.

In accordance with certain aspects of the present description, to obtain RTDs more easily in the case of OTDOA, a Positioning MRMs method may be employed to determine the RTDs between pairs of base stations as described above. This determination may not occur in real time since it may be necessary to first gather the MRM measurement data across part or all of a network from a large number of terminals before calculating the mobile terminal locations and RTDs iteratively from the redundant OTD measurements. Hence, the obtained RTDs may relate to times in the past. However, one may use such "historic" RTD values to determine whether the RTD is static or changing and, in the latter case, whether it is changing at a deterministic rate (e.g., whether there may be some constant drift or other definable change in each RTD).

Base stations 104 may be enabled, as is known, to support precise timing and to maintain a constant transmission rate over certain periods. Exceptions to this are normally rare and, when they occur, normally involve a sudden change of timing from one stable setting to another. By examining the RTDs, it may be possible to determine those pairs of base stations for which constant (or at least deterministic) timing may be supported compared to other pairs of base stations for which timing differences may be erratic or have changed from one stable value to another. By obtaining RTDs for several or many pairs of base stations in which the same base stations appears more than once, it may also be possible to isolate any individual base stations which have erratic timing or sudden changes in stable timing. For example, if RTDs are obtained between pairs of base stations in the set {A, B, C}, and it is observed that base station pair {A, B} exhibits a stable or deterministic RTD whereas base station pairs {B, C} and {A, C} exhibit erratic or suddenly changed RTDs, then it may be concluded that base stations A and B must have constant or deterministic timing whereas C is erratic or suddenly changed.

The RTDs between all base stations with constant or deterministic timing may then be used to support location determination using OTDOA because it may reasonable to infer the RTDs between these base stations in the future. Moreover, if the RTDs are periodically, recalculated, any changes to base station timing (e.g., a change from one stable RTD value to another) may be detected.

In terms of location determination accuracy, the accuracy of the location of target mobile terminal 102-t may be limited by the accuracy of the RTDs obtained by the positioning MRMs method. As such, the accuracy of the location of target mobile terminal 102-t may be improved with higher accuracy in the OTDs provided by terminals in the periodic signal measurements sent to the network.

Example of Block 316

In accordance with certain other aspects of the present description, network events may be identified using location tagging based on the methodologies presented herein according to Block 316. A network may sometimes experience a large number of related and possibly significant events either temporarily or over a prolonged time intervals. Examples of this may include a large number of dropped calls, call attempt failures, call handovers, dropped text messages and/or other types of service failure and anomaly. However, such network events may be specific to certain locations. Such network events may be one off, intermittent or continuous. It may be beneficial for an operator to determine the location of such network events in order to help determine the cause and/or determine suitable actions for recovery or improvement.

If the location of one or more mobile terminals may be determined where such network events are experienced, then such network events may be location tagged and/or otherwise handled. The location of a mobile terminal, for example, may be determined using a positioning MRMs method as presented herein, e.g., using pattern matching and/or OTDs.

Once the location of a mobile terminal is obtained, the network event together with the location may be sent to a network resource along with similar locations and events obtained for other mobile terminals. By viewing the ensemble of reported events and locations, a human and/or automatic analysis tool may be employed to isolate specific location areas, time periods, etc., with a high incidence of unusual but common network events.

Example of Block 314

In accordance with certain other aspects of the present description, fine time assistance for SPS (e.g., A-GPS, A-GNSS, or the like) location may be provided according to Block 314 using the methodologies herein.

It is known that the accuracy, reliability and response time of location estimates for mobile terminals obtained using SPS techniques, such as Assisted GPS (A-GPS) or Assisted Global Navigation Satellite System (A-GNSS) for systems such as Galileo or GLONASS or modernized GPS may be improved if the mobile terminal is provided with an accurate SPS (e.g., GPS or GNSS) reference time. This may be accomplished if the network provides a mobile terminal with fine time assistance information associating the local transmission timing of the serving base station (or some other observable neighboring base station) and such SPS time. The mobile terminal may then use this association/information to derive SPS time at any future time through association with the current base station transmission timing.

In order to provide fine timing assistance to mobile terminals, a network may use its own measurement capabilities (e.g., using hardware/software elements in each base station and/or other like elements external to the base station) to measure the association of base station and SPS timing. However, such arrangements may be expensive to deploy. A less expensive alternative may be to rely on such measurements provided by mobile terminals whose locations are also provided or determined (e.g., if a mobile terminal provides the network with both the base station timing associations with SPS time and either its current location or a set of SPS measurements that may be used by the network to derive the mobile terminal location). Knowing the mobile terminal's location, network resources may, for example, calculate a propagation delay to a base station and may adjust the association provided by the mobile terminal between a base station timing and SPS time to the association between these times that is applicable to the location of the base station rather than the mobile terminal. This timing association may, for example, be used later to provide a timing association to another terminal.

One possible concern with the second method above may be that not all terminals may support SPS location and even those that do may not always provide the necessary data (e.g., base station to SPS timing association and either SPS location measurements or a location estimate derived from this). This may be due to battery conservation and/or deactivation of location support by the user, for example. A similar concern may apply to the first method above if the network deploys only enough measurement elements to provide timing association for some but not necessarily all base stations. This may result in a network knowing the SPS timing association for only a subset of the base stations.

To overcome this limitation, the exemplary positioning MRMs methods presented herein may be used to determine the RTDs between pairs of base stations and the stability of these RTDs and/or a possible drift rate. If the SPS timing association with a base station "X" is known, the SPS timing association with another base station "Y" may be determined, for example, by using the RTD between X and Y to convert X transmission timing to Y transmission timing. This technique may be applied when the RTD between X and Y is known directly and when it is not known directly but where RTDs are known between a sequence of base stations pairs {X, B1}, {B1, B2}, {B2, B3}, ... {Bn-1, Bn}, {Bn,Y} since in the latter case, the RTDs for the individual base station pairs may be combined (e.g., summed) to give the RTD between X and Y.

Using the positioning MRMs method to determine the RTDs betweens pairs of base stations may therefore enable a network to extend the known transmission timing associations with SPS time for a number of base stations to cover all or most base stations in the network. This then may enable fine time assistance information to be provided to a number of mobile terminals.

While certain example networks have been illustrated thus far, it should be understood that certain example mobile terminals, base stations, networks, etc., may be enabled for use with various wireless communication networks, such as, a wireless wide area network (WWAN), a wireless local area network (WLAN), a wireless personal area network (WPAN), and so on. Herein, the term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

In certain exemplary implementations, the methodologies, techniques and/or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media can comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
accessing positioning information stored in a database, the positioning information associated with wireless signaling measurements and observed timing differences (OTDs) of received signals collected from a plurality of mobile terminals and a plurality of base stations; and
determining location information for a target mobile terminal based, at least in part, on said positioning information and signaling information associated with said target mobile terminal, wherein determining the location information for the target mobile terminal includes determining the location information for the target mobile terminal based on an observed time difference of arrival (OTDOA) for the target mobile terminal and on at least one estimated real time difference (RTD) determined based, at least in part, on said OTDs collected from the plurality of mobile terminals and the plurality of base stations;
wherein at least some of the wireless signaling measurements collected from the plurality of mobile terminals and the plurality of base stations, including wireless signaling measurements for performing signal pattern matching, are associated with respective locations of the plurality of mobile terminals and the plurality of base stations determined, at least in part, based on the OTDs and on the at least one estimated RTD.

2. The method as recited in claim 1, wherein determining location information for said target mobile terminal comprises performing signal pattern matching based, at least in part, on said positioning information and said signaling information associated with said target mobile terminal.

3. The method as recited in claim 1, further comprising: receiving said signaling information associated with said target mobile terminal.

4. The method as recited in claim 1, further comprising: providing said location information to a network location service.

5. The method as recited in claim 1, wherein at least one of said wireless signaling measurements comprises corresponding time-stamp information.

6. The method as recited in claim 1, wherein at least one of said wireless signaling measurements comprises corresponding mobile terminal location information.

7. The method as recited in claim 6, wherein said mobile terminal location information is based, at least in part, on Satellite Positioning System (SPS) information.

8. The method as recited in claim 7, wherein said SPS information is based, at least in part, on one or more of Global Positioning System (GPS) data, Assisted-GPS (A-GPS) data, Global Navigation Satellite Services (GNSS) data, and Assisted-GNSS (A-GNSS) data.

9. The method as recited in claim 1, wherein at least one of said wireless signaling measurements is based, at least in part, on a Measurement Report Message (MRM) associated with at least one of said plurality of mobile terminals.

10. The method as recited in claim 1, wherein at least one of said wireless signaling measurements is associated with Wideband Code Division Multiple Access (WCDMA) signaling.

11. The method as recited in claim 1, wherein said positioning information comprises Real Time Difference (RTD) information.

12. The method as recited in claim 1, further comprising: predicting one or more estimated Real Time Differences (RTDs) based, at least in part, on said positioning information.

13. The method as recited in claim 12, further comprising: determining an estimated location of said target mobile terminal based, at least in part, on an Observed Time Difference of Arrival (OTDOA) and at least one of said one or more estimated RTDs.

14. The method as recited in claim 12, further comprising: establishing fine time assistance information for at least one base station based, at least in part, on at least one of said one or more estimated RTDs.

15. The method as recited in claim 14, further comprising: providing said fine time assistance information to one or more of said at least one base station and at least one mobile terminal.

16. The method as recited in claim 14, wherein said fine time assistance information is associated with a Satellite Positioning System (SPS) time.

17. The method as recited in claim 1, further comprising: determining event location information associated with at least one network event based, at least in part, on said location information.

18. The method as recited in claim 1, wherein at least one of said wireless signaling measurements comprises a combined wireless signaling measurement.

19. The method as recited in claim 18, further comprising: determining a distribution of mobile terminals within a coverage area based, at least in part, on said combined signal measurement.

20. The method as recited in claim 1, wherein said location information is based, at least in part, on Observed Time Difference of Arrival (OTDOA) information associated with said target mobile terminal.

21. The method as recited in claim 1, further comprising: establishing said positioning information by:
receiving wireless signal measurements and OTDs associated with said plurality of mobile terminals and said plurality of base stations, and
determining location estimates for said plurality of mobile stations and RTDs for said plurality of base stations; and
establishing signal measurements for different locations based, at least in part, on said wireless signal measurements and said location estimates.

22. An apparatus comprising:
means for accessing positioning information stored in a database, the positioning information associated with wireless signaling measurements and observed timing differences (OTDs) of received signals collected from a plurality of mobile terminals and a plurality of base stations; and
means for determining location information for a target mobile terminal based, at least in part, on said positioning information and signaling information associated with said target mobile terminal, wherein the means for determining the location information for the target mobile terminal include means for determining the location information for the target mobile terminal based on an observed time difference of arrival (OTDOA) for the target mobile terminal and on at least one estimated real time difference (RTD) determined based, at least in part, on said OTDs collected from the plurality of mobile terminals and the plurality of base stations;
wherein at least some of the wireless signaling measurements collected from the plurality of mobile terminals and the plurality of base stations, including wireless signaling measurements for performing signal pattern matching, are associated with respective locations of the plurality of mobile terminals and the plurality of base stations determined, at least in part, based on the OTDs and on the at least one estimated RTD.

23. The apparatus as recited in claim 22, wherein said means for determining location information for said target mobile terminal comprises:
   means for performing signal pattern matching based, at least in part, on said positioning information and said signaling information associated with said target mobile terminal.

24. The apparatus as recited in claim 22, further comprising: means for receiving said signaling information associated with said target mobile terminal.

25. The apparatus as recited in claim 22, further comprising: means for providing said location information to a network location service.

26. The apparatus as recited in claim 22, wherein at least one of said wireless signaling measurements comprises corresponding time-stamp information.

27. The apparatus as recited in claim 22, wherein at least one of said wireless signaling measurements comprises corresponding mobile terminal location information.

28. The apparatus as recited in claim 27, wherein said mobile terminal location information is based, at least in part, on Satellite Positioning System (SPS) information.

29. The apparatus as recited in claim 28, wherein said SPS information is based, at least in part, on one or more of Global Positioning System (GPS) data, Assisted-GPS (A-GPS) data, Global Navigation Satellite Services (GNSS) data, and Assisted-GNSS (A-GNSS) data.

30. The apparatus as recited in claim 22, wherein at least one of said wireless signaling measurements is based, at least in part, on a Measurement Report Message (MRM) associated with at least one of said plurality of mobile terminals.

31. The apparatus as recited in claim 22, wherein at least one of said wireless signaling measurements is associated with Wideband Code Division Multiple Access (WCDMA) signaling.

32. The apparatus as recited in claim 22, wherein said positioning information comprises Real Time Difference (RTD) information.

33. The apparatus as recited in claim 22, further comprising: means for predicting one or more estimated Real Time Differences (RTDs) based, at least in part, on said positioning information.

34. The apparatus as recited in claim 33, further comprising: means for determining an estimated location of said target mobile terminal based, at least in part, on an Observed Time Difference of Arrival (OTDOA) and at least one of said one or more estimated RTDs.

35. The apparatus as recited in claim 33, further comprising: means for establishing fine time assistance information for at least one base station based, at least in part, on at least one of said one or more estimated RTDs.

36. The apparatus as recited in claim 35, further comprising:
   means for providing said fine time assistance information to one or more of said at least one base station and at least one mobile terminal.

37. The apparatus as recited in claim 35, wherein said fine time assistance information is associated with a Satellite Positioning System (SPS) time.

38. The apparatus as recited in claim 22, further comprising: means for determining event location information associated with at least one network event based, at least in part, on said location information.

39. The apparatus as recited in claim 22, wherein at least one of said wireless signaling measurements comprises a combined wireless signaling measurement.

40. The apparatus as recited in claim 39, further comprising: means for determining a distribution of mobile terminals within a coverage area based, at least in part, on said combined signal measurement.

41. The apparatus as recited in claim 22, wherein said location information is based, at least in part, on Observed Time Difference of Arrival (OTDOA) information associated with said target mobile terminal.

42. The apparatus as recited in claim 22, further comprising:
   means for establishing said positioning information comprising:
      means for receiving wireless signal measurements and OTDs associated with said plurality of mobile terminals and said plurality of base stations, and
      means for determining location estimates for said plurality of mobile stations and RTDs for said plurality of base stations; and
   means for establishing signal measurements for different locations based, at least in part, on said wireless signal measurements and said location estimates.

43. An apparatus comprising:
   memory having stored therein positioning information associated with wireless signaling measurements and observed timing differences (OTDs) of received signals collected from a plurality of mobile terminals and a plurality of base stations; and
   a processing unit operatively coupled to said memory and operatively enabled to determine location information for a target mobile terminal based, at least in part, on said positioning information and signaling information associated with said target mobile terminal, wherein the processing unit operatively enabled to determine the location information for the target mobile terminal is operatively enabled to determine the location information for the target mobile terminal based on an observed time difference of arrival (OTDOA) for the target mobile terminal and on at least one estimated real time difference (RTD) determined based, at least in part, on said OTDs collected from the plurality of mobile terminals and the plurality of base stations;
   wherein at least some of the wireless signaling measurements collected from the plurality of mobile terminals and the plurality of base stations, including wireless signaling measurements for performing signal pattern matching, are associated with respective locations of the plurality of mobile terminals and the plurality of base stations determined, at least in part, based on the OTDs and on the at least one estimated RTD.

44. The apparatus as recited in claim 43, wherein said processing unit is operatively enabled to determine said location information for said target mobile terminal by performing signal pattern matching based, at least in part, on said positioning information and said signaling information associated with said target mobile terminal.

45. The apparatus as recited in claim 43, further comprising:
   a receiver operatively coupled to one or more of said memory and said processing unit and operatively enabled to receive said signaling information associated with said target mobile terminal over a communication link.

46. The apparatus as recited in claim 43, further comprising:

a transmitter operatively coupled to one or more of said memory and said processing unit and operatively enabled to provide said location information to a network location service over a communication link.

47. The apparatus as recited in claim 43, wherein at least one of said wireless signaling measurements comprises corresponding time-stamp information.

48. The apparatus as recited in claim 43, wherein at least one of said wireless signaling measurements comprises corresponding mobile terminal location information.

49. The apparatus as recited in claim 48, wherein said mobile terminal location information is based, at least in part, on Satellite Positioning System (SPS) information.

50. The apparatus as recited in claim 49, wherein said SPS information is based, at least in part, on one or more of Global Positioning System (GPS) data, Assisted-GPS (A-GPS) data, Global Navigation Satellite Services (GNSS) data, and Assisted-GNSS (A-GNSS) data.

51. The apparatus as recited in claim 43, wherein at least one of said wireless signaling measurements is based, at least in part, on a Measurement Report Message (MRM) associated with at least one of said plurality of mobile terminals.

52. The apparatus as recited in claim 43, wherein at least one of said wireless signaling measurements is associated with Wideband Code Division Multiple Access (WCDMA) signaling.

53. The apparatus as recited in claim 43, wherein said positioning information comprises Real Time Difference (RTD) information.

54. The apparatus as recited in claim 43, wherein said processing unit is operatively enabled to predict one or more estimated Real Time Differences (RTDs) based, at least in part, on said positioning information.

55. The apparatus as recited in claim 54, wherein said processing unit is operatively enabled to determine an estimated location of said target mobile terminal based, at least in part, on an Observed Time Difference of Arrival (OTDOA) and at least one of said one or more estimated RTDs.

56. The apparatus as recited in claim 54, wherein said processing unit is operatively enabled to establish fine time assistance information for at least one base station based, at least in part, on at least one of said one or more estimated RTDs.

57. The apparatus as recited in claim 56, wherein said processing unit is operatively enabled to provide said fine time assistance information to one or more of said at least one base station and at least one mobile terminal.

58. The apparatus as recited in claim 56, wherein said fine time assistance information is associated with a Satellite Positioning System (SPS) time.

59. The apparatus as recited in claim 43, wherein said processing unit is operatively enabled to determine event location information associated with at least one network event based, at least in part, on said location information.

60. The apparatus as recited in claim 43, wherein at least one of said wireless signaling measurements comprises a combined wireless signaling measurement.

61. The apparatus as recited in claim 60, wherein said processing unit is operatively enabled to determine a distribution of mobile terminals within a coverage area based, at least in part, on said combined signal measurement.

62. The apparatus as recited in claim 43, wherein said location information is based, at least in part, on Observed Time Difference of Arrival (OTDOA) information associated with said target mobile terminal.

63. The apparatus as recited in claim 43, wherein said processing unit is operatively enabled to:

establish said positioning information by receiving wireless signal measurements and OTDs associated with said plurality of mobile terminals and said plurality of base stations, and determining location estimates for said plurality of mobile stations and RTDs for said plurality of base stations; and establish signal measurements for different locations based, at least in part, on said wireless signal measurements and said location estimates.

64. An article comprising:

a non-transitory computer readable medium having computer implementable instructions stored thereon which if implemented by one or more processing units operatively enable the one or more processing units to:

access positioning information stored in a database, the positioning information associated with wireless signaling measurements and observed timing differences (OTDs) of received signals collected from a plurality of mobile terminals and a plurality of base stations; and determine location information for a target mobile terminal based, at least in part, on said positioning information and signaling information associated with said target mobile terminal, wherein the computer implementable instructions that enable the one or more processing units to determine the location information for the target mobile terminal include computer implementable instructions that enable the one or more processing units to determine the location information for the target mobile terminal based on an observed time difference of arrival (OTDOA) for the target mobile terminal and on at least one estimated real time difference (RTD) determined based, at least in part, on said OTDs collected from the plurality of mobile terminals and the plurality of base stations;

wherein at least some of the wireless signaling measurements collected from the plurality of mobile terminals and the plurality of base stations, including wireless signaling measurements for performing signal pattern matching, are associated with respective locations of the plurality of mobile terminals and the plurality of base stations determined, at least in part, based on the OTDs and on the at least one estimated RTD.

65. The article as recited in claim 64, further comprising computer implementable instructions which if implemented by the one or more processing units operatively enable the one or more processing units to: determine said location information for said target mobile terminal by performing signal pattern matching based, at least in part, on said positioning information and said signaling information associated with said target mobile terminal.

66. The article as recited in claim 64, further comprising computer implementable instructions which if implemented by the one or more processing units operatively enable the one or more processing units to: provide said location information to a network location service.

67. The article as recited in claim 64, wherein at least one of said wireless signaling measurements comprises corresponding time-stamp information.

68. The article as recited in claim 64, wherein at least one of said wireless signaling measurements comprises corresponding mobile terminal location information.

69. The article as recited in claim 68, wherein said mobile terminal location information is based, at least in part, on Satellite Positioning System (SPS) information.

70. The article as recited in claim 69, wherein said SPS information is based, at least in part, on one or more of Global Positioning System (GPS) data, Assisted-GPS (A-GPS) data, Global Navigation Satellite Services (GNSS) data, and Assisted-GNSS (A-GNSS) data.

71. The article as recited in claim 64, wherein at least one of said wireless signaling measurements is based, at least in part, on a Measurement Report Message (MRM) associated with at least one of said plurality of mobile terminals.

72. The article as recited in claim 64, wherein at least one of said wireless signaling measurements is associated with Wideband Code Division Multiple Access (WCDMA) signaling.

73. The article as recited in claim 64, wherein said positioning information comprises Real Time Difference (RTD) information.

74. The article as recited in claim 64, further comprising computer implementable instructions which if implemented by the one or more processing units operatively enable the one or more processing units to: predict one or more estimated Real Time Differences (RTDs) based, at least in part, on said positioning information.

75. The article as recited in claim 74, further comprising computer implementable instructions which if implemented by the one or more processing units operatively enable the one or more processing units to: determine an estimated location of said target mobile terminal based, at least in part, on an Observed Time Difference of Arrival (OTDOA) and at least one of said one or more estimated RTDs.

76. The article as recited in claim 74, further comprising computer implementable instructions which if implemented by the one or more processing units operatively enable the one or more processing units to:
  establish fine time assistance information for at least one base station based, at least in part, on at least one of said one or more estimated RTDs.

77. The article as recited in claim 76, further comprising computer implementable instructions which if implemented by the one or more processing units operatively enable the one or more processing units to:
  provide said fine time assistance information to one or more of said at least one base station and at least one mobile terminal.

78. The article as recited in claim 76, wherein said fine time assistance information is associated with a Satellite Positioning System (SPS) time.

79. The article as recited in claim 64, further comprising computer implementable instructions which if implemented by the one or more processing units operatively enable the one or more processing units to:
  determine event location information associated with at least one network event based, at least in part, on said location information.

80. The article as recited in claim 64, wherein at least one of said wireless signaling measurements comprises a combined wireless signaling measurement.

81. The article as recited in claim 80, further comprising computer implementable instructions which if implemented by the one or more processing units operatively enable the one or more processing units to: determine a distribution of mobile terminals within a coverage area based, at least in part, on said combined signal measurement.

82. The article as recited in claim 64, wherein said location information is based, at least in part, on Observed Time Difference of Arrival (OTDOA) information associated with said target mobile terminal.

83. The article as recited in claim 64, further comprising computer implementable instructions which if implemented by the one or more processing units operatively enable the one or more processing units to:
  establish said positioning information by receiving wireless signal measurements and OTDs associated with said plurality of mobile terminals and said plurality of base stations, and determining location estimates for said plurality of mobile stations and RTDs for said plurality of base stations; and
  establish signal measurements for different locations based, at least in part, on said wireless signal measurements and said location estimates.

\* \* \* \* \*